United States Patent [19]
Chen et al.

[11] Patent Number: 5,682,523
[45] Date of Patent: Oct. 28, 1997

[54] SYSTEM AND METHOD FOR COLLECTING AND RETRIEVING NETWORK PROBLEM DETERMINATION DATA WITH A GENERIC COLLECTION SUBSYSTEM REPORTING TO AN AGENT ON DEMAND

[75] Inventors: David De-Hui Chen, Cary; William Frank McKenzie, Jr., Raleigh; Ellen DePaolis, Raleigh; Leo Temoshenko, Raleigh, all of N.C.

[73] Assignee: International Business Machines Corporation, Armonk, N.Y.

[21] Appl. No.: 168,113

[22] Filed: Dec. 15, 1993

[51] Int. Cl.$^6$ .................................................. G06F 17/30
[52] U.S. Cl. ........................... 395/600; 364/DIG. 1; 364/264; 364/265; 364/282.4; 364/285; 395/200.11
[58] Field of Search ................................. 395/600, 200.11

[56] References Cited

U.S. PATENT DOCUMENTS

| | | | |
|---|---|---|---|
| 4,837,798 | 6/1989 | Cohen et al. | 379/88 |
| 5,241,621 | 8/1993 | Smart | 395/51 |
| 5,283,856 | 2/1994 | Gross et al. | 395/51 |
| 5,317,568 | 5/1994 | Bixby et al. | 370/85.6 |
| 5,331,642 | 7/1994 | Valley et al. | 371/502 |
| 5,404,231 | 4/1995 | Bloomfield | 358/400 |

OTHER PUBLICATIONS

Chen et al, "The Manager's Consultant: An Intelligent Framework for Network Mangement", Proceedings of the IEEE/ACM International Conference on Developing and Managing Expert System Programs, 30 Sep. 20 Oct. 1991, pp. 380–387.

Young-pa So et al, "Distributed Big Brother", Proceedings of the Eighth Conference on Artificial Intelligence for Applications, 2–6 Mar. 1992, pp. 295–301.

Gaiti, "Intelligent Distributed Systems: New Trends", Proceedings of the Fourth Workshop on Future Trends of Distributed Computing Systems, 22–24 Sep. 1993, pp. 106–111.

*Primary Examiner*—Wayne Amsbury
*Attorney, Agent, or Firm*—Stephen T. Keohane; John J. Timar

[57] ABSTRACT

A new system and method allow one or more Managers in a network to retrieve from an Agent problem determination data relating to the Agent's Components. The system and method of the present invention allow the Manager to use standard mechanisms to retrieve and display the Agent's problem determination data. A generic collection subsystem created by the Agent acts as an interface for the Agent to the Components for collecting and organizing the problem determination data received from the Components. The collection subsystem receives and stores problem determination data from each of the components in tables which are organized based upon the type of problem determination data. Within each table, the data objects may be stored chronologically, for example. The collection subsystem responds to all requests from the Agent for stored problem determination data. The requests may specify particular parameters such as the type of problem and time it occurred.

16 Claims, 5 Drawing Sheets

Fig. 4

| Data Table 30 | |
|---|---|
| | Table Name 32 |
| Entry 1 | Object 1 = time |
| | Object 2 = date |
| | Object 3 = type |
| | Object 4-m = data items |
| Entry 2 | Object 1 = time |
| | Object 2 = date |
| | Object 3 = type |
| | Object 4-n = data items |
| Entry 3 | Object 1 = time |
| | Object 2 = date |
| | Object 3 = type |
| | Object 4-p = data items |
| Entry 4 | Object 1 = time |
| | Object 2 = date |
| | Object 3 = type |
| | Object 4-q = data items |
| Entry z | Object 1-r |

36a, 36b, 36c, 36d 34a, 34b, 34c, 34d, 34z

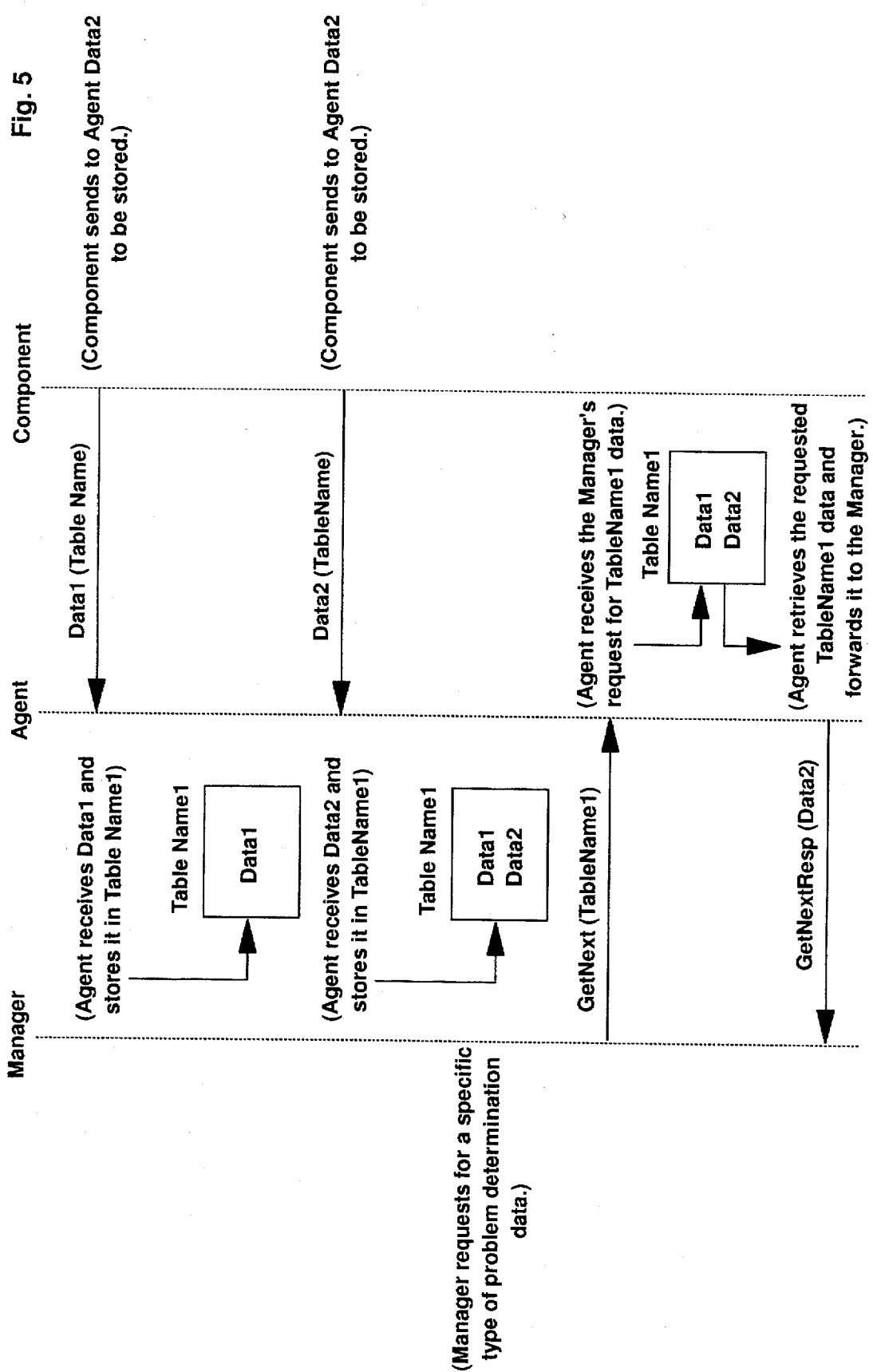

SYSTEM AND METHOD FOR COLLECTING AND RETRIEVING NETWORK PROBLEM DETERMINATION DATA WITH A GENERIC COLLECTION SUBSYSTEM REPORTING TO AN AGENT ON DEMAND

BACKGROUND OF THE INVENTION

1. Field of the Invention

The present invention relates to network management and, more particularly, to a system and method for collecting problem determination data by an Agent in a network for its retrieval by the network Manager.

2. Background and Prior Art

Data communication has become a fundamental part of computing. World-wide networks gather data about such diverse subjects as atmospheric conditions, crop production, and airline traffic. These networks evolved as independent entities without the ability, or, until recently, the need, to interconnect with one another. New technologies, generically named "internetworking", have emerged making it possible to interconnect many disparate physical networks and make them function as a coordinated unit. Using internetworking technologies, a host, for example, on one network, may send data which traverses multiple networks to communicate with another host on a different network.

The size of an "internet", or group of interconnected networks, can vary quite significantly. For instance, the resulting network may be enormously large, such as the nation-wide DARPA (Defense Advanced Research Projects Agency)/NSF (National Science Foundation) Internet which connects most major research institutions, including universities, corporate and government labs. Conversely, the network may be relatively small, comprising only a single corporation's individual local area networks (LANs).

No matter the size of the network, it is clear that the task of effectively managing the resulting interconnected network is quite important and has been given a great deal of attention in the networking community. In managing a network, a network manager must keep track of the devices on the networks, monitor the network's performance and load, and diagnose and correct any problems.

Using presently available network management protocols such as SNMP (Simple Network Management Protocol) and CMIP (Common Management Information Protocol), network administrators (via "Managers") can address queries and commands to managed network nodes and devices (via "Agents") as the means of communication for managing the network. "Components", which communicate with an Agent in a node or device, perform the specific functions required by the managed node or device. For example, where the managed node is a router, several Components may be utilized such as an SNA Component for performing SNA-related networking functions and a TCP/IP Component for performing all TCP/IP-related networking functions.

Each Agent stores management data received from its Components and responds to the Manager's requests for this data, or may send an unsolicited message to the Manager after sensing a prespecified condition (by sending an SNMP "TRAP" or a CMIP "EVENT NOTIFICATION"). The Manager queries/controls Agents using various commands defined by the particular network management protocol.

FIG. 1 illustrates a simplified network having four interconnected nodes, Node 1, Node 2, Node 3 and Node 4. The nodes are logically interconnected by transmission groups (TGs). As can be seen, Node 1 is connected to Node 2 by TG A, Node 1 to Node 4 by TG E, and so forth. Each node is a managed network device and has an Agent for keeping management data and for communicating with the Manager, which is logically connected to each Agent.

The Manager is responsible for, among other things, monitoring network performance and status, controlling operational parameters, and reporting, analyzing and isolating faults in its managed domain. Toward this end, the Manager must collect problem determination data from its Agents so that the faults in its managed domain may be analyzed and isolated. (For the purposes of this specification, "problem determination data" comprises data relating to networking problems which are associated to the particular managed node.) Obviously, it is desirable that the Manager may retrieve such data in an accurate and timely manner. It is also desirable that the Manager be able to select which types of data to collect in order that it may focus its problem determination analysis if necessary.

In present systems, there are a number of different methods in which problem determination data is collected and retrieved. In one method, a core dump is performed at a node where a problem is known to have happened. Using the "core dump" method, the network administrator, wishing to analyze a problem which has occurred at a node, takes a dump of the node's core memory. For instance, where the node erroneously drops a session with another node, in order to determine the reason why the node dropped the session, the network administrator obtains a copy of the entire machine core memory on a storage medium, such as one or more floppy disks, and searches through the data on the medium. The characteristic identifying the specific problem to the network administrator may or possibly may not be found in the core memory. Clearly, this is an inefficient and unreliable method of collecting and identifying problem determination data.

In another method, each of the node's Components logs problem determination data in a table for future reference. For instance, where a node has four Components, each Component logs the problem determination data in its own table as the problems are detected. Because the Components in a node are different from one another, the problem determination data is recorded in many different formats. This makes it difficult for the network administrator to analyze as all the data first needs to be translated to a format understandable by the network administrator.

Furthermore, in such a system, the data is stored in many different log tables, one log table for each Component. The stored data is merely stored chronologically—in the order that the problem occurred—by each Component in its respective table.

Thus, in such a system, the network administrator is required to retrieve all of the tables (by either using a file transfer to a diskette or to the administrator's workstation directly), interpret and translate the different formats of the different tables of Component problem determination data, and search through the chronologically arranged data until the desired problem determination data is located. Clearly, this is an inefficient and cumbersome process. Further, this method and the "core dump" method may require a device level restart (or IPL) which is disruptive to a portion of the network.

In another method, each Component in a node forwards problem determination data to its Agent in real time as the problem occurs. The Agent, upon receiving the problem determination data from one of its Components, sends an unsolicited message to its Manager with the problem determination data—whether the Manager is ready for it or not. (In SNMP, for instance, such an unsolicited message is called a "TRAP".) The "TRAP" method is disruptive to both the Manager and the Agent as each has other network management responsibilities which may be continually interrupted by the sending and receiving of such unsolicited problem determination messages. Furthermore, this method does not allow the Manager to solicit problem determination data at all such—as where it wishes to analyze selective problem determination entries. Finally, the "TRAP" method is unreliable as TRAPs or other unsolicited messages may get lost in the network or the Manager may not be available to accept the TRAPs.

In summary, presently, there is no method or system which a Manager may selectively retrieve specific types of problem determination entries from one or more of its Agents. Further, there is no present method or system allowing a Manager to have a convenient way of displaying the problem determination data without having to perform a variety of processing steps in order to interpret and translate the data to a useable format. Finally, there is no present method or system in an Agent which provides a generic interface to Components and to Managers for receiving and storing problem determination data from all Components and for responding to requests for problem determination data from a Manager for all of the Components.

SUMMARY OF THE INVENTION

A new system and method allow one or more Managers in a network to retrieve from an Agent problem determination data relating to the Agent's Components. The system and method of the present invention allow the Manager to use standard mechanisms to retrieve and display the Agent's problem determination data. A generic collection subsystem created by the Agent acts as an interface for the Agent to the Components for collecting, organizing and formatting the problem determination data received from the Components. The collection subsystem receives and stores problem determination data from each of the components in tables which are organized based upon the type of problem determination data. Within each table, the data objects may be stored chronologically, for example. The collection subsystem responds to all requests from the Agent for stored problem determination data. The requests may specify particular parameters such as the type of problem and time it occurred.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 4 illustrates a table of problem determination data as stored in the Generic Problem Determination Data Collection Subsystem.

FIG. 5 illustrates the message flows between a Manager, an Agent and a Component during the collecting, organizing and formatting of problem determination data.

DETAILED DESCRIPTION OF THE PREFERRED EMBODIMENT

The method and system of the present invention may be utilized in any network having management functionality. In the preferred embodiment, the invention is described in terms of a network conforming to the Simple Network Management Protocol (SNMP). In such a network, an SNMP Manager can address queries and commands to Agents responsible for monitoring network nodes and devices. The Manager monitors network performance and status; controls operational parameters; and reports, analyzes and isolates faults in its managed domain. The Manager must keep an accounting of these and other activities and does so by regularly querying its Agents.

Using the method and system of the present invention, the Manager may retrieve problem determination data which is collected from the Components within the Manager's domain. By retrieving selective problem determination data objects, the Manager is able to analyze and isolate faults and problems within the network.

Figure 1:
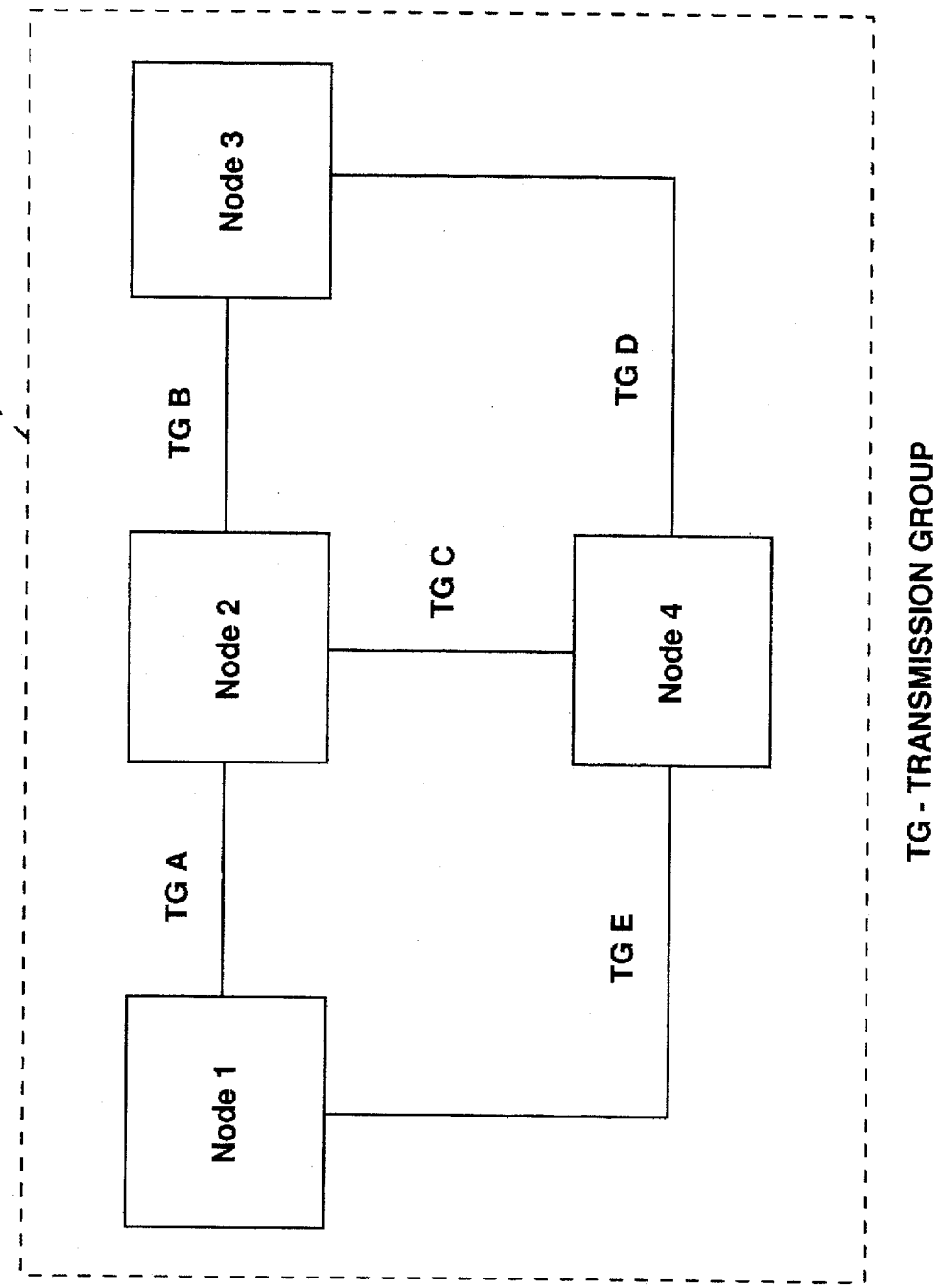
FIG. 1 is a block diagram of a representative communications network within which the present invention may be practiced.
Figure 2:
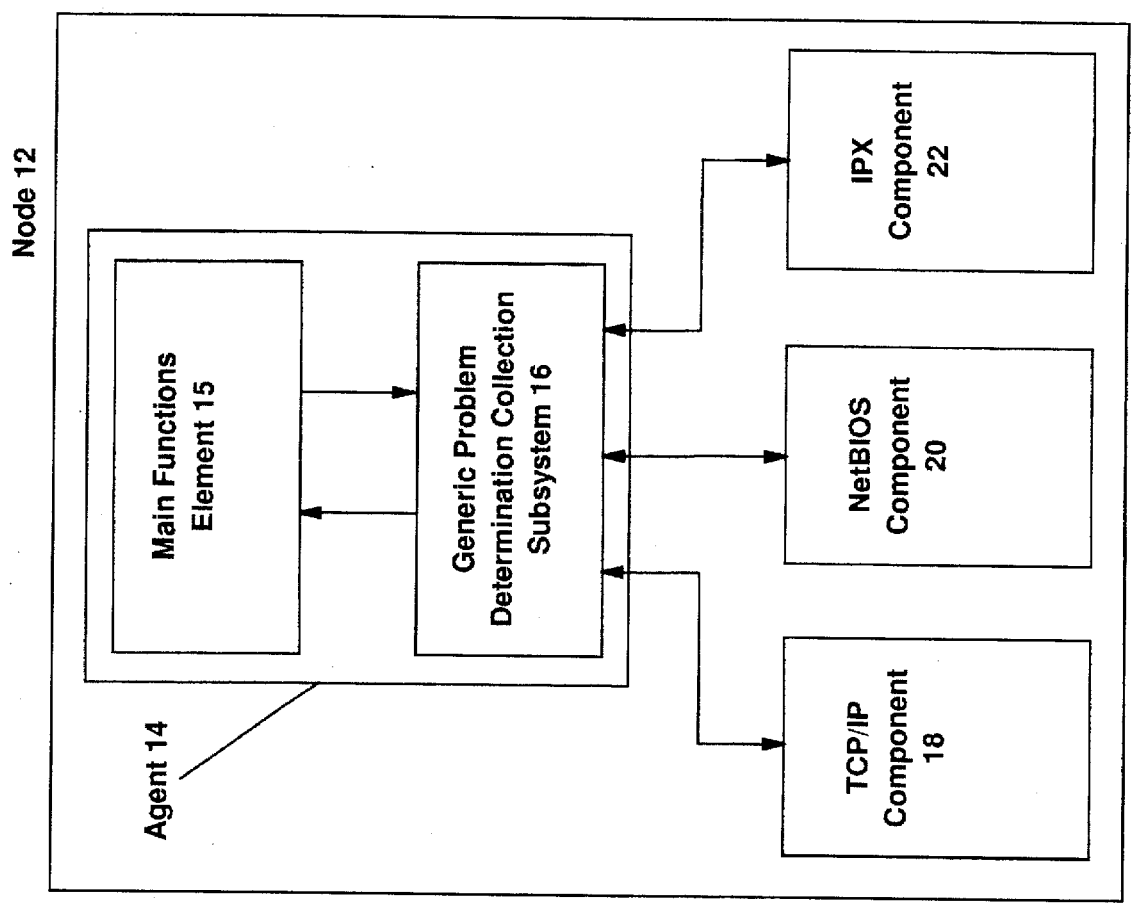
FIG. 2 illustrates a high level block diagram of the elements of a node comprising the system of the present invention: an Agent, a Generic Problem Determination Data Collection Subsystem, and a plurality of Components.

FIG. 2 illustrates a node 12 comprising an Agent 14, having a Main Functions Element 15, which for the purposes of this specification performs major Agent functions, and Generic Problem Determination Data Collection Subsystem 16 of the present invention, and Components 18, 20 and 22. For simplicity, node 12 is shown to have a single Agent 14 and three Components 18, 20 and 22 although the node may be supported by a number of Agents and have many more Components. Further, the node may have a network Manager. In the present example, the Manager is physically and logically located at another node and communicates with the Agent 14 via the Main Functions Element 15.

In the example shown in FIG. 2, the managed node is a router supporting a number of different routing protocols: TCP/IP, APPN, and IPX. Components 18, 20 and 22 correspond to these networking protocols and each performs all functions related to its respective specific networking protocol. As discussed, one of the functions performed by each Component 18, 20 and 22 is the collection of problem determination data. As each Component collects such data, it forwards the data to the Generic Problem Determination Data Collection Subsystem 16 which determines the type of problem determination data and stores the data accordingly. When the Agent 14 receives requests from the Manager via Main Functions Element 15 for problem determination data, Main Functions Element 15 issues requests for the problem determination data to the Subsystem 16. The Subsystem 16 retrieves the data and forwards it to the Main Functions Element 15, which, in turn, forwards it to the Manager.

Figure 3:
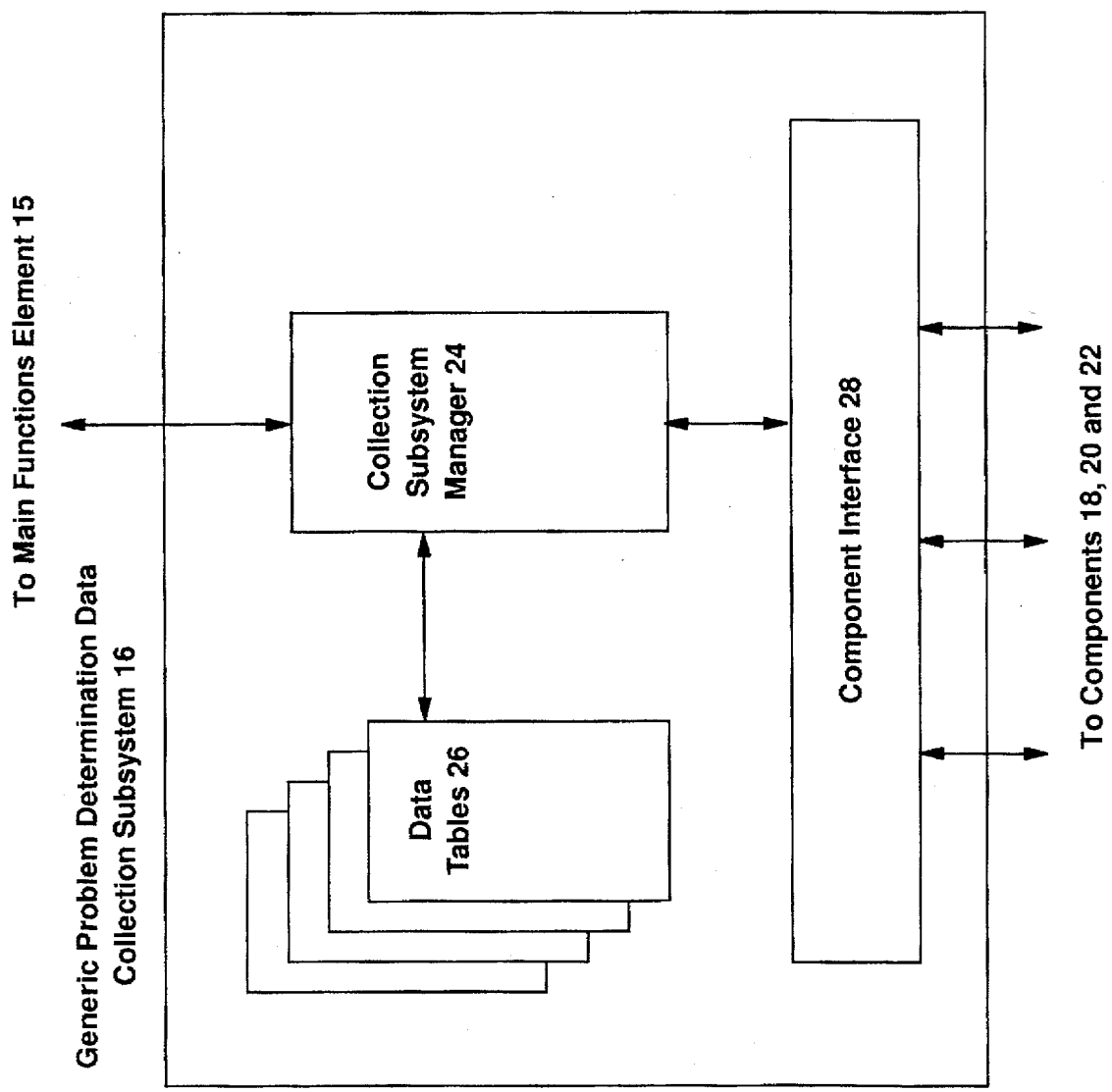
FIG. 3 illustrates a block diagram of the Generic Problem Determination Data Collection Subsystem of the present invention.

FIG. 3 illustrates a block diagram of the Generic Problem Determination Data Collection Subsystem 16. Subsystem 16 comprises a Collection Subsystem Manager 24, a plurality of Data Tables 26 for storing problem determination data entries which are collected from the Components and a Component Interface element 28 for providing an interface to the various Components. The Collection Subsystem Manager 24 performs a variety of functions for the Generic Problem Determination Data Collection Subsystem 16 such as receiving and responding to requests from the Main Functions Element, storing and retrieving data entries to and from the Data Tables 26, receiving data entries from the Component Interface 28 and organizing the received data entries for storage in the Tables 26.

FIG. 4 illustrates a Data Table 30 which is an example of the problem determination data tables which are built and maintained within the Generic Problem Determination Data Collection Subsystem 16 by Collection Subsystem Manager 24. Data Table 30 comprises a Table Name 32 which indicates to the Collection Subsystem Manager 24 what type of data is stored therein. Using the Table Name 32, the Collection Subsystem Manager 24 may retrieve specific data requested by the network Manager or may store data received from the Components in the appropriate location for future use. Data Table 30 further consists of a plurality of entries 34a, 34b, 34c, 34d and 34z (or Entry 1, Entry 2, Entry 3, Entry 4 and Entry z). These entries are specific problem determination data entries received from the Components. Each entry consists of a number of data objects 36a, 36b, 36c, and 36d. The data objects provide the specific details of the problem detected by the Component. For instance, data Object 1 (36a) indicates the time that the problem was detected, data Object 2 (36b) indicates the date the problem was detected, data Object 3 (36c) indicates the type of problem detected and data Objects 4-m represent other problem specifics which may be needed by the network administrator. It should be noted that Data Table 30 may contain any number of entries 34 and that each entry may contain any number of data objects.

FIG. 5 is an illustration of message and data flows between one Component and an Agent in a managed node and between the Agent and a network Manager. In the illustration, the Component detects a problem and forwards the problem determination data (Data1) to the Agent for storage. The Component identifies the type of data entry by indicating the table name (TableName1) in which the data is to be stored. This indication takes the form of a header attached to the beginning of the data entry.

The Agent receives the data entry and stores it (Data1) in the proper data table (TableName1).

The Component detects a another problem and forwards the problem determination data (Data2) to the Agent for storage. The Component again identifies the type of data entry by indicating the table name (TableName1) in which the data is to be stored.

The Agent receives the data entry and stores it (Data2) in the proper data table (TableName1).

As was discussed, the Manager, from time to time, may need to examine a particular type of problem data. In the present example, the Manager issues a request (GetNextRequest) for the first data entry of the type stored in TableName1. (In the present example, the Manager and the Agent exchange messages in the SNMP format but other management protocols may also be used.) The Agent receives the request and retrieves, from the data table (TableName1) the first data entry (Data2) and forwards it to the Manager (GetNextResp(Data2)).

If the Manager needs to examine additional data entries from TableName1, it would issue additional GetNextRequests (or equivalent commands) for the desired data entries. If the Manager desires another type of data, it would specify the type to the Agent so that the Agent may retrieve the appropriate data entry.

Thus, it can be seen that the method and system of the present invention allows a Manager to retrieve from an Agent problem determination data relating to the Agent's Components using standard mechanisms to retrieve and display the Agent's problem determination data. A generic collection subsystem created by the Agent acts as an interface for the Agent to the Components for collecting and organizing the problem determination data received from the Components. The collection subsystem receives and stores problem determination data from each of the components in tables which are organized based upon the type of problem determination data. The collection subsystem responds to all requests from the Agent for stored problem determination data. The requests may specify particular parameters such as the type of problem and time it occurred. While the invention has been particularly shown and described with reference to preferred embodiments thereof, it will be understood by those skilled in the art that various other changes in form and detail may be made without departing from the spirit and scope of the invention.

What is claimed is:

1. For use in a managed node of a network comprising at least one Manager, said managed node comprising at least one Agent for communicating with said Manager using a network management protocol and at least one Component for performing specific networking functions for said managed node, a problem determination data collection system comprising:

a plurality of data tables for storing problem determination data entries;

means, connected to said at least one Component, for receiving problem determination data entries;

means for storing said entries in said data tables;

means, connected to said Agent, for receiving requests from said Agent for data entries from said data tables;

means for retrieving said requested data entries; and means for sending to said Agent said requested data entries.

2. The problem determination data collection system defined in claim 1 wherein said storing means comprises means for determining the type of problem based upon said received data entry and for storing said received data entry in one of said data tables based upon the type of problem.

3. The problem determination data collection system defined in claim 2 wherein each data entry includes a header indicating the type of problem and said type of problem determining means has means for inspecting said header.

4. The problem determination data collection system defined in claim 3 wherein said header includes a time stamp and a sequence number.

5. The problem determination data collection system defined in claim 1 wherein said plurality of data tables correspond to a plurality of problem types.

6. A managed node of a network comprising at least one Manager, said managed node comprising:

at least one Component for performing specific networking functions for said managed node;

at least one Agent having a problem determination data collection system comprising:

a plurality of data tables for storing problem determination data entries;

means, connected to said at least one Component, for receiving problem determination data entries;

means for storing said entries in said data tables;

means for communicating with said Manager using a network management protocol and for receiving requests from said Manager for data entries from said data tables;

means for retrieving said requested data entries; and means for sending to said Manager said requested data entries.

7. The managed node defined in claim 6 wherein said storing means comprises means for determining the type of problem based upon said received data entry and for storing said received data entry in one of said data tables based upon the type of problem.

8. The managed node defined in claim 7 wherein each data entry includes a header indicating the type of problem and said type of problem determining means has means for inspecting said header.

9. The managed node defined in claim 7 wherein said plurality of data tables correspond to a plurality of problem types.

10. The managed node defined in claim 7 wherein said at least one Component comprises means for creating said data entries based upon problems detected by at said Component.

11. The managed node defined in claim 10 wherein said Component creating means comprises means for creating a header having an indicator of the type of problem detected.

12. For use in a managed node of a network comprising at least one Manager, said managed node comprising at least one Component for performing specific networking functions for said managed node, at least one Agent having a problem determination data collection system comprising a plurality of data tables for storing problem determination data entries, a method of collecting and storing problem determination data comprising the steps of:

receiving problem determination data entries from said at least one Component;

storing said entries in said data tables;

receiving requests from said Manager for data entries from said data tables;

retrieving said requested data entries; and sending to said Manager said requested data entries using a network management protocol.

13. The method defined in claim 12 wherein said storing step comprises the steps of determining the type of problem based upon said received data entry and storing said received data entry in one of said data tables based upon the type of problem.

14. The method defined in claim 13 wherein each data entry includes a header indicating the type of problem and said type of problem determining step comprises the step of inspecting said header.

15. The method defined in claim 13 further comprising the step of creating said data entries based upon problems detected by at said Component.

16. The method defined in claim 15 wherein said creating step comprises the step of creating a header having an indicator of the type of problem detected.

* * * * *